Jan. 30, 1945.  R. M. HARMON  2,368,137
PROTECTED PACKING SEAL
Filed Dec. 22, 1943
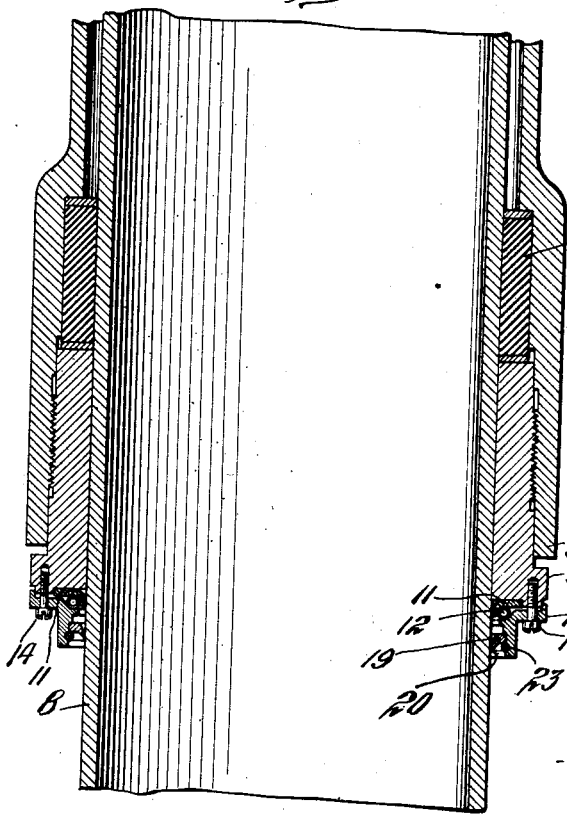
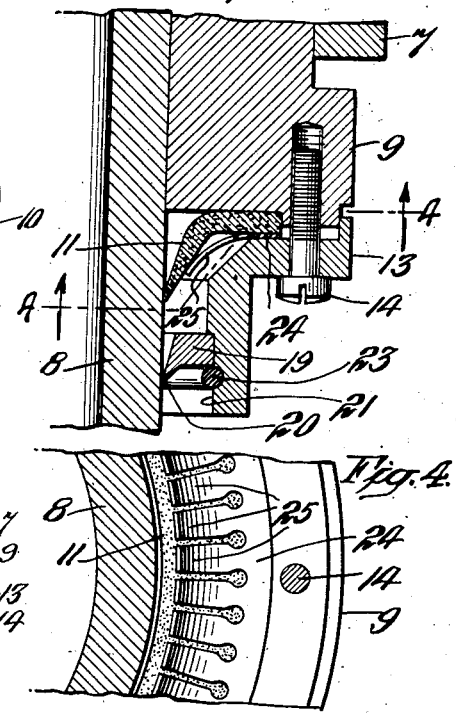
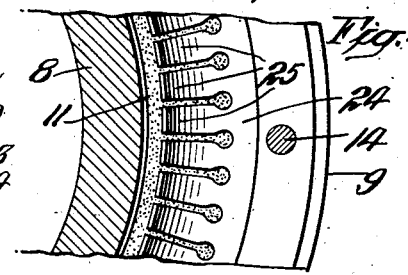
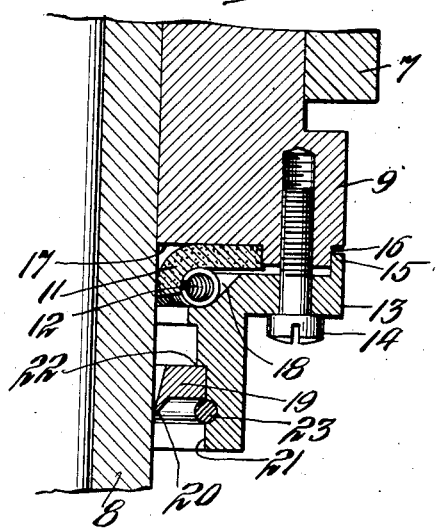
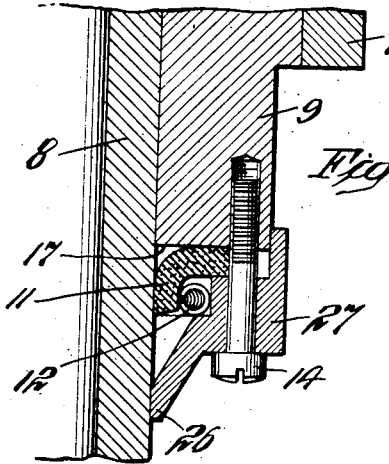
INVENTOR.
RALPH M. HARMON
BY
ATTORNEY Patented Jan. 30, 1945

2,368,137

UNITED STATES PATENT OFFICE 2,368,137

PROTECTED PACKING SEAL

Ralph M. Harmon, Wichita, Kans., assignor to Beech Aircraft Corporation, Wichita, Kans., a corporation of Delaware Application December 22, 1943, Serial No. 515,317

5 Claims. (Cl. 286—18)

The invention here disclosed relates to packing seals for airplane landing gear shock struts, hydraulic actuating cylinders and the like.

It is essential that all dirt and foreign matter be excluded from the packing glands of such devices and it is important that this be accomplished within minimum dimensions.

It is desirable furthermore that any such protective means be readily accessible and quickly removable for cleaning or replacement purposes.

The objects of the present invention are to provide a packing seal which will fully meet the foregoing requirements and which will be practical in all respects.

These and other desirable objects are attained in the present invention by the novel features of construction, combinations and relations of parts hereinafter set forth, illustrated by way of example in the accompanying drawing and broadly covered in the claims.

In the drawing, several of the present practical forms of the invention are shown, but actual structure may be further modified and changed all within the true intent and broad scope of the invention as hereinatfer defined and claimed.

Fig. 1 in the drawing, is a broken longitudinal sectional view showing the invention as applied to the so-called "Oleo" shock absorber landing gear strut of an airplane.

Fig. 2 is an enlarged fragmentary detail of the same.

Fig. 3 is a similar view of a modification.

Fig. 4 is a cross-sectional detail as on line 4—4 of Fig. 3.

Fig. 5 is a broken longitudinal section of another modified form of the invention.

In Fig. 1, the cylinder, barrel or bearing cap of a landing gear strut is indicated at 7, and the cooperating piston tube at 8, operating through the bearing provided by the gland nut 9, acting on the packing 10.

This packing gland is sealed by a ring 11, of soft flexible sealing material, such as leather, a composition of similar characteristics or a metallic composition, closely fitted to and engaging the polished surface of the piston tube. This seal, as particularly shown in Fig. 2, may have an abrupt inner edge and be resiliently confined in inclined relation, so as to provide a relatively sharp corner edge in engagement with the tube.

In practice, the seal may be formed as a flat washer with an inside diameter somewhat less than the diameter of the tube and flanged out of the plane of the washer, or it may be molded to a suitable shape to thereby engage the piston tube on an inward incline and to provide at the outside of the flange so formed, a seat for a contracting spring 12.

The seal made up of the washer and contracting spring is held in place on the end of the gland nut by a retainer shown in the form of a ring 13, secured by screws 14, and having a peripheral positioning flange 15, engageable over the reduced end portion 16, of the nut.

The sealing washer is shown as seating partly in an annular positioning recess 17, so that it may be clampingly held by the retainer ring and the latter is shown as having an annular seat 18, for the spring 12.

To protect the seal and maintain it in condition for properly sealing the packing gland, a scraper is provided in front of or at the outside of the seal.

In the first form of the invention, this guard or protector is shown in the form of a metal ring 19, having an inwardly inclined sharpened or chisel-like cutting or scraping edge 20, closely conforming to and substantially engaging the surface of the piston tube.

This scraper ring is shown as entered in an enlarged portion 21, in the outer end of the retainer 13, and held seated against a shoulder 22, by a snap ring 23.

Enclosed within and reinforced by the mounting or retainer 13, the scraper ring can be a relatively small light piece and will be capable of cutting free any mud, dirt, ice or the like, on the piston tube, protecting and keeping the flexible seal in proper condition to perform its wiping and cleaning action.

Any wear on either the scraper or the wiper can be easily taken care of. By tightening screws 14, the resilient wiper can be compressed into closer engagement with the piston tube. On releasing the snap ring 23, the scraper ring can be removed and cleaned or be given a new edge, or a new scraper be substituted. Removal of screws 14, permits removal of the entire assembly, enabling replacement of the sealing ring, the helical compression spring, the rigid scraper or any other part of the mechanism.

The retainer and combined wiping and scraping structure confined or carried thereby, occupies but small space at the end of the cylinder, where it is fully accessible and where it will not interfere with other parts.

The modification illustrated in Figs. 3 and 4 differs from the first form shown, particularly in respect to the tensioning of the flexible seal 11, against the piston tube. In this instance, the spring pressure is applied by a flat annular spring element 24, overlying the flat outer rim of the seal and having inwardly extending radial spring fingers 25, pressing on the inwardly inclined flange portion of the seal.

Fig. 5 illustrates a form of the invention similar to that first disclosed but having the inwardly inclined mud scraper flange 26, formed as an integral portion of the retainer ring 27.

In all forms, the structure is simple and sturdy, light in weight and takes up small space. The seal is soft or of suitable hardness and close fitting enough to wipe the piston and keep it clean, and the scraper is sufficiently rigid and strong to loosen and break up mud, ice and like foreign matter, protecting the seal from injury and enabling the seal to then wipe or brush off such loosened material. While of particular value for hydraulic shock struts, hydraulic actuators or the like, the invention is useful in many other places where it is necessary or desirable to provide a self-protecting seal for packing glands.

What is claimed is:

1. A protected packing seal comprising in combination with a cylinder and a piston operating therein, packing between said cylinder and piston, a gland nut for compressing the packing on the piston, a wiper of soft, flexible material tensioned in wiping engagement with the piston at the entrance to said gland nut and forming a seal for the packing, and a scraper on the gland nut in front of said wiper, said scraper being of stiff, rigid material in scraping relation to the piston for removing adherent mud, ice or other solids from the piston prior to engagement of the piston by the soft, flexible wiper sealing the packing.

2. A protected packing seal comprising in combination with a cylinder and a piston operating therein, packing between said cylinder and piston, a gland nut for compressing the packing on the piston, a wiper of soft, flexible material tensioned in wiping engagement with the piston at the entrance to said gland nut and forming a seal for the packing, and a scraper on the gland nut in front of said wiper, said scraper being of stiff, rigid material in scraping relation to the piston for removing adherent mud, ice or other solids from the piston prior to engagement of the piston by the soft, flexible wiper sealing the packing, the gland nut having an annular seat at the entrance end of the same, the wiper being supported and positioned on said seat, a retainer ring secured to the gland nut over said wiper and adjustable for tensioning the wiper against the piston and the scraper being carried by said retainer ring and whereby both the wiper and the scraper may be removed upon separation of said retainer ring from the gland nut.

3. A protected packing seal comprising in combination with a cylinder and a piston operating therein, packing between said cylinder and piston, a wiper of soft, flexible material supported by said cylinder and a retainer ring adjustably secured over said wiper for tensioning said soft, flexible wiper in wiping engagement with the piston, said retainer ring being of rigid material and having an integral inwardly inclined mud scraper flange in scraping engagement with the piston at a point in advance of engagement of the piston by said soft, flexible wiper.

4. A protected packing seal comprising in combination with a cylinder and a piston operating therein, packing between said cylinder and piston, a wiper of soft, flexible material supported by said cylinder, a retainer ring adjustably secured in engagement over said wiper for tensioning said soft, flexible wiper in wiping engagement with the piston, and a scraper ring removably mounted on said retainer ring in scraping engagement with the piston at a point in advance of engagement of the piston by said wiper.

5. A protected packing seal comprising in combination with a cylinder and a piston operating therein, packing between said cylinder and piston, a wiper of soft, flexible material at the end of said cylinder tensioned in wiping engagement with said piston and forming a seal for said packing and a scraper of stiff, rigid material supported by the cylinder in scraping relation to the piston in advance of said wiper for clearing the piston of adherent mud, ice or other solids prior to engagement of the piston by said soft, flexible wiper.

RALPH M. HARMON.